Oct. 10, 1933.  J. B. OLSON  1,929,789
POULTRY WATERER
Filed July 21, 1928  2 Sheets-Sheet 1

INVENTOR.
John B. Olson
BY
Erwin, Wheeler & Woolard
ATTORNEYS.

Oct. 10, 1933.   J. B. OLSON   1,929,789
POULTRY WATERER
Filed July 21, 1928   2 Sheets-Sheet 2

INVENTOR.
John B. Olson
BY
Erwin, Wheeler & Woolard
ATTORNEYS.

Patented Oct. 10, 1933

1,929,789

UNITED STATES PATENT OFFICE 1,929,789

POULTRY WATERER

John B. Olson, Fort Atkinson, Wis., assignor to James Manufacturing Company, Fort Atkinson, Wis., a corporation of Wisconsin Application July 21, 1928. Serial No. 294,515

2 Claims. (Cl. 119—73)

This invention relates to improvements in poultry waterers. Its object is improved sanitation, reduction in fire hazard, improved facilities for access to the water by the fowls and the attainment of these objects while reducing construction costs and increasing durability and convenience of assembly and disassembly for cleansing or repair purposes.

In the drawings.

Like parts are identified by the same reference characters throughout the several views.

Figure 1:
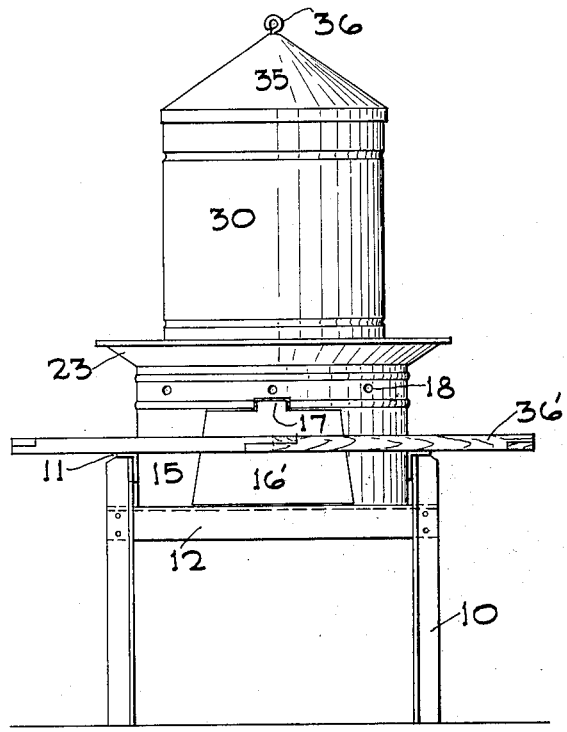
Figure 1 is a side elevation of a poultry waterer embodying my invention.
Figure 2:
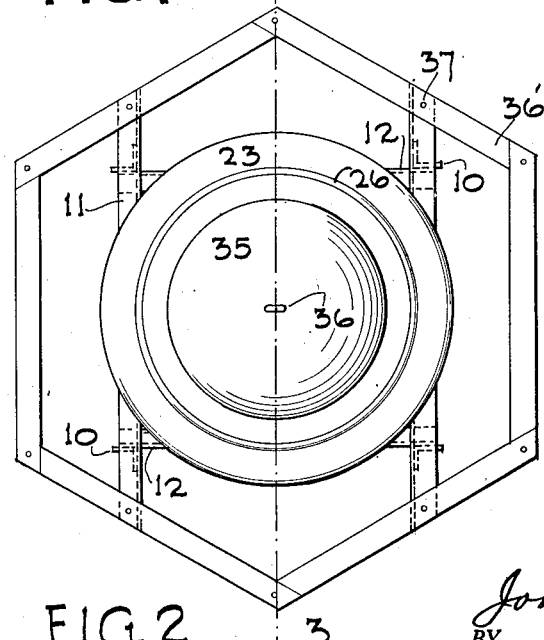
Figure 2 is a plan view of the same.
Figure 3:
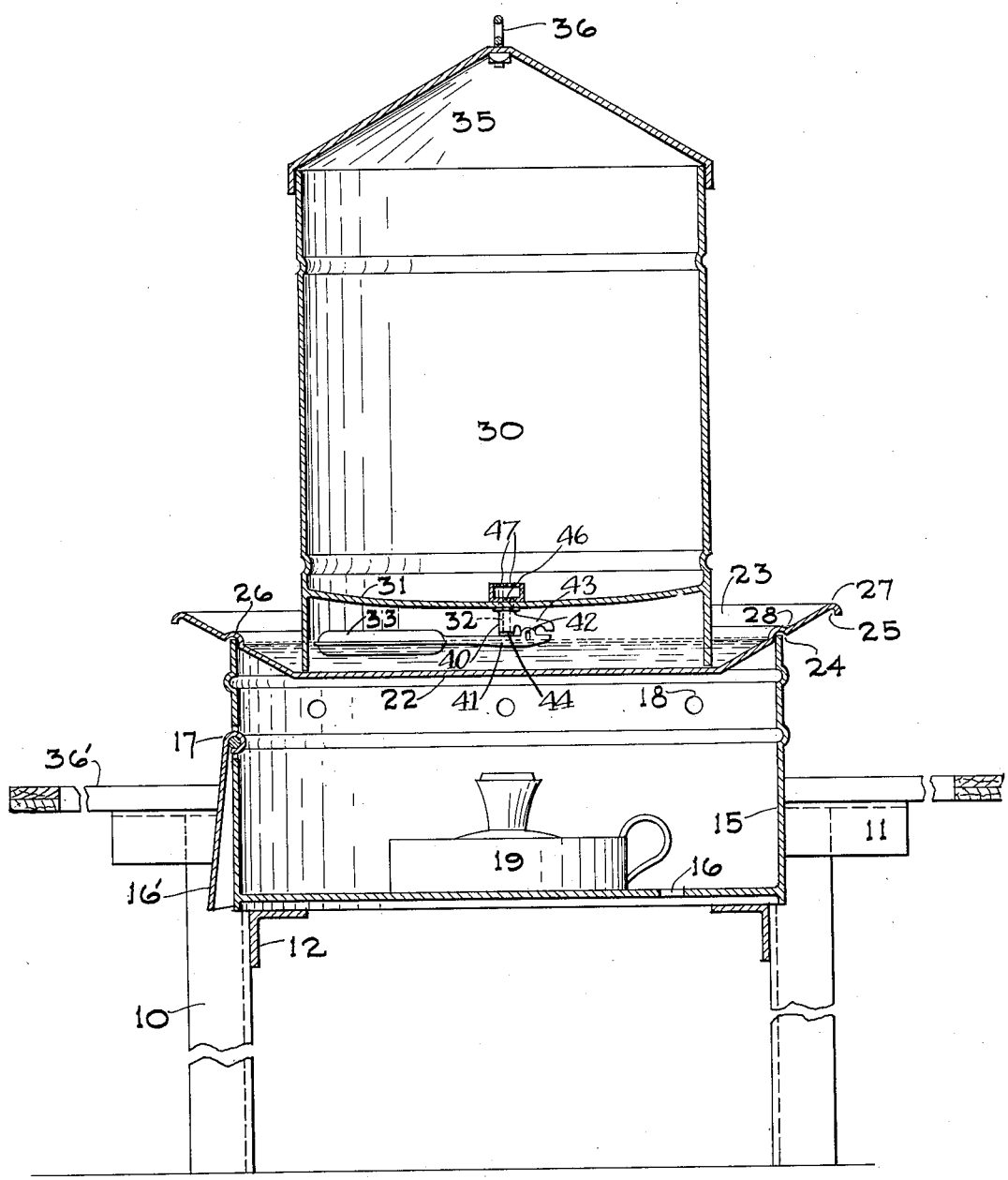
Figure 3 is a sectional view taken on line 3—3 of Figure 2.

A frame is formed with supporting legs 10 having their upper ends connected in pairs by bars 11 and cross connected in pairs at a lower level by bars 12. These frame members 10, 11, and 12 are preferably composed of angle iron and the bars 11 are of greater length than the legs which they connect and are disposed with one flange capping the legs and the other flange extending downwardly along the inner side of each associated leg. The bars 12 are disposed with one flange in a vertical plane and secured to the inner faces of the inwardly projecting flanges of the associated legs 10. The other flange of each bar 12 projects inwardly from the upper margin of the vertical flange and forms a shelf upon which a heating chamber 15, preferably cylindrical, may rest. The bottom of this heating chamber is substantially closed except for one lamp hole 16 and the cylindrical side wall has a diameter substantially equal to the distance between the vertical flanges of the bars 11. The heating chamber is provided with a door 16' having its upper margin pivoted at 17 to the wall of the chamber and adapted to drop by gravity to a closed position. A number of openings 18 are also provided, this chamber being designed to receive a heater such, for example, as the lamp 19.

The heating chamber 15 is open at the top but is normally closed by a circular watering pan having a flat bottom portion 22 and a widely flaring annular wall side 23 provided with annular channels 24 and 25 in its under surface. The pan is preferably formed of sheet metal and the channels are formed by pressing the material in concavo convex form in a die, thereby forming annular convex ribs 26 and 27 on the upper surface of the flaring side wall corresponding with the channels 24 and 25 in the under surface. The outer rib 27 forms a re-enforcing margin for the pan, and curves downwardly to an edge margin without forming a roosting bed. The channel 24 has a diameter equal to that of the heating chamber and receives the upper margin of the the cylindrical heating chamber wall. The corresponding upwardly projecting rib forms a water receiving cavity 28 which receives water dripping from the bills of the fowls and prevents it from flowing downwardly into the central portion of the pan and contaminating the major supply of the drinking water.

The construction is such that the open shallow water receiving cavity 28 may be cleansed and the water removed by any absorbent mop employed for that purpose, the contour of the pan wall being such as to facilitate inspection and cleansing.

The central portion of the pan is fed with water from the cylindrical superposed reservoir 30. This preferably is of substantially the same diameter as the flat bottom portion 22 of the pan and it has a raised bottom 31. A valve mechanism including a supporting member 40 is suitably connected to the underside of the raised bottom 31 and has a float 33 which is provided with an arm 41 arranged to be pivotally connected as at 42 to the lateral projecting arm 43 of the member 40. The arm 41 has a rubber pad or the like 44 mounted thereon which is arranged to be moved into and out of alignment with a valve opening 32 in the member 40 for controlling the flow of water from the reservoir 30 to the float chamber formed between the spaced bottoms 22 and 31, respectively. It will be seen that this float chamber is wholly protected from litter or other foreign material that might interfere with the operation of the float mechanism and valve. A hollow guard member 45 may be suitably positioned on the raised bottom 31 and has an opening 46 therein aligned with the opening 32 in the member 40. Water from the tank 30 may be introduced into the member 45 through small ports or apertures 47, so that when the float 33 moves the rubber pad 44 away from the member 40, the water will flow into the float chamber. The downward movement of the float 33 is limited by engagement of the arm 41 with the adjacent end of the arm 43, thus preventing contact of the float with the pan bottom 22.

Ordinarily water will pass underneath the lower margin of the cylindrical wall of the reservoir but this lower margin may be slightly corrugated or roughened to provide openings between it and the bottom of the pan of sufficient size to ensure an outward flow of water, the float being adjusted with reference to the height of the rib 26 in such a manner as to prevent water from the reservoir from overflowing that rib. The rib, therefore, serves as a dam between the water supplied directly from the reservoir and that which accumulates beyond the rib by dripping from the bills of the fowls.

The portion of the pan below the rib 26 constitutes the capping portion for the heater, and the supply of water in the pan is limited to this portion, whereas the outwardly and upwardly projecting portion of the pan beyond the rib 24 extends over the space between the heater and the perch, thus compelling the fowls to extend their necks over the outer bead or rim 27, and downwardly to the water-containing space below the rib 28. This outer portion of the pan wall, therefore, serves as a guarding portion too close to the reservoir to permit fowls to roost thereon when drinking, and sufficiently distant inwardly from the perch to allow the fowls convenient access to the water in the pan which is kept warm by the heater in the heater housing.

The reservoir is preferably provided with a removable cap 35 which may be made conical to prevent the fowls from roosting thereon and it may have an eye piece 36 to facilitate its removal for the purpose of cleansing the reservoir or replenishing the water therein.

A frame 36', preferably hexagonal, is secured at 37 to the outwardly projecting ends of the bars 11. The hexagonal frame can be made for less cost than a circular perch and each of the frame bars is sufficiently short so that fowls may readily reach the water contained in the pan between the reservoir and the rib 26. I have found that a pan having a flaring side wall having approximately a 30° pitch outwardly and upwardly from its horizontal central portion and having a spread of about 4 inches from the flat bottom portion 22 of the pan will catch substantially all of the drip from the bills of the fowls and collect nearly all of it in the space between the ribs 26 and 27, the fowls uniformly lifting their heads and usually turning them slightly to one side or the other when swallowing.

It will be observed that the poultry waterer herein disclosed may be wholly constructed of metal although wooden perch bars are preferably employed. It will also be observed that the metal parts have maximum strength in proportion to weight and are also formed to faciliate separation of the parts, it being possible to lift the magazine from the pan and then lifting the pan from the heating chamber and the heating chamber from the frame without disconnecting any bolts or other fastenings. On the other hand when the parts are assembled each is securely anchored against any pressures that the fowls may exert thereon and the heater is supported above the litter on the floor at such a height as to make it impossible for the fowls to scratch or disturb the litter such as straw or shavings in such a manner as to bring it into contact with the flame or any heated surface which might otherwise ignite the litter. The supporting legs 10 are of sufficient height to allow the fowls to freely pass underneath the heating chamber, and they will, therefore, prevent accumulation of straw and similar material which otherwise might be accumulated in such quantities as to bring it in contact with the heating chamber or cause it to be pushed through the door 16'.

I claim:

1. A poultry waterer having a pan, the side wall of which extends outwardly and gradually upwardly from the horizontal plane of its bottom, said wall having an intermediate groove in its under surface and a corresponding upwardly projecting horizontally extending rib arranged to serve as a dam to retain water dripping upon the outer portion of said wall, perches located below and outwardly spaced from the upper margin of said wall and positioned to require the fowls to reach over the space between the outer margin of the wall and the rib to obtain access to the water and means for maintaining a supply of water in the central portion of the pan at a substantially constant level below the top of said rib; said wall having a sufficiently low inclination to allow the drippings to be retained upon it by said rib and said groove being adapted to afford anchorage for a support receivable therein.

2. In a poultry waterer, the combination with a raised support and a heating chamber mounted thereon, of a water pan having a flaring wall bearing intermediately upon the side walls of the heating chamber, said pan constituting a removable top for the heating chamber, a reservoir in the central portion of the pan, having a raised bottom provided with a float operated valve controlling delivery of water into the pan for maintenance of a constant level therein exterior to the reservoir, a valve case mounted in the bottom of the reservoir and provided with a float supporting arm, a float pivoted to said arm in position for operating the valve when lifted by water underneath said raised bottom, and means for preventing water and other material dropped upon the outer portion of said flaring wall of the pan from flowing or sliding into the drinking water supply, said means and the portion of the reservoir wall below its raised bottom being co-operative to protect the drinking water supply and the float operated valve mechanism.

JOHN B. OLSON.